UNITED STATES PATENT OFFICE.

JONAS HOOVER, OF OSCALOOSA, IOWA.

IMPROVEMENT IN REMOVING FOREIGN SUBSTANCES FROM SUGAR.

Specification forming part of Letters Patent No. 47,420, dated April 25, 1865.

*To all whom it may concern:*

Be it known that I, JONAS HOOVER, of Oscaloosa, in the county of Mahaska and State of Iowa, have invented a new and Improved Process for Removing Foreign Substances from Cane-Sugar; and I do hereby declare that the following is a full and exact description thereof, and which will enable any person skilled in the art to practice and perform the same.

My invention has particularly for its object the purification of that class of sugars which are manufactured from the sirup of the "sorghum" and "olatreitan" cane, and relates to the removal from such sugars of the sticky chlorophyl matter remaining in the sugar after its granulation, as well as the peculiar greenish color to which sugars are subject when manufactured from such "cane." After the process of granulation has taken place there still remains a gummy substance intermingled with the sugar, which the process of purification in boiling the sirup has failed to remove. This substance, by the ordinary means of draining or pressure, cannot be removed, so as to leave the sugar free of coloring-matter, dry, and of the "lively" appearance desirable for merchantable sugars.

To thoroughly cleanse a mass of this class of sugar, I subject it immediately after "granulation" to a bath composed of sweet milk and alcohol. This is done by first mixing the milk and alcohol together, and then thoroughly mixing the same with the crude sugar. The effect of the milk and alcohol is such as to thoroughly dissolve the sticky substance which adheres to the sugar. Immediately upon the mixture of the sugar with the milk and alcohol I subject the mass of sugar thus treated to a heavy pressure in the ordinary way, which, when done, partially leaves the mass free from foreign substances. After this first pressure is completed I then put a layer of the sugar upon a dry cotton or other cloth, and then lay thereon another dry cloth, and upon it another layer of sugar, and so on until the whole mass of sugar under treatment is disposed of in layers of sugar with cloth intervening. I then immediately subject the whole to a heavy pressure, the effect of which is to remove the remaining gum by the same being absorbed in the cloths, thus leaving the sugar pure, of good color, lively, and dry.

I would here state that to a given quantity of the crude sugar I only apply sufficient of the alcohol and milk to thoroughly moisten it without materially dissolving the sugar. For instance, for twenty-five pounds of sugar I use one-fourth of a pint of alcohol and three pints of milk, and preserve these relative proportions for any greater quantity of sugar to be treated. If, however, the sugar should be quite dry, a greater amount of the milk and alcohol may be used.

Having thus described my invention, what I claim as new, and desire to secure by Letters Patent of the United States, is—

1. Treating crude sugar to alcohol and sweet milk, substantially as and for the purpose described.

2. Subjecting sugar to a second pressure between cloths after the same has been moistened with alcohol and milk and once pressed, substantially as described.

JONAS HOOVER.

Witnesses:
J. B. COULTER,
C. L. CAIN.